2,885,978

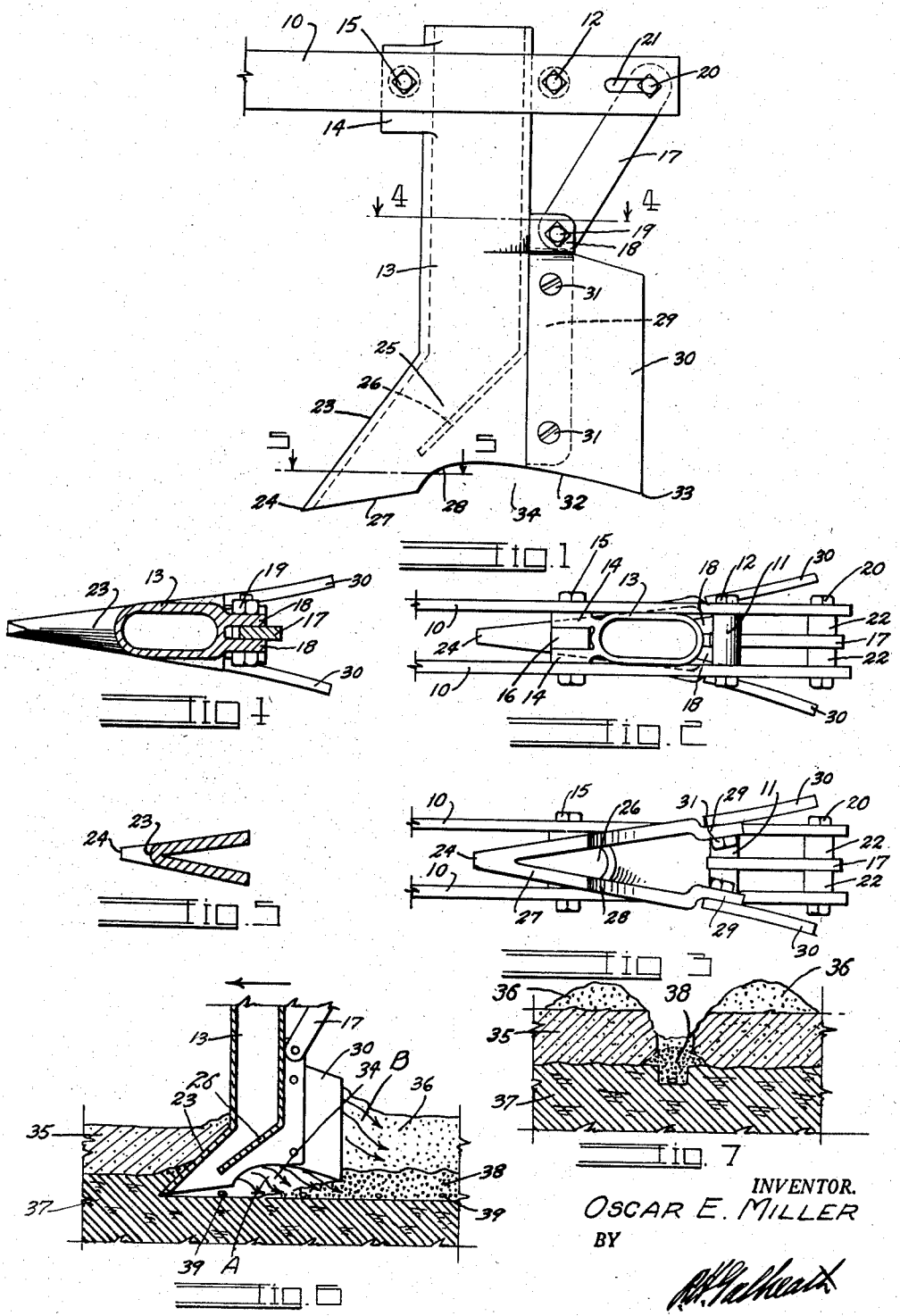

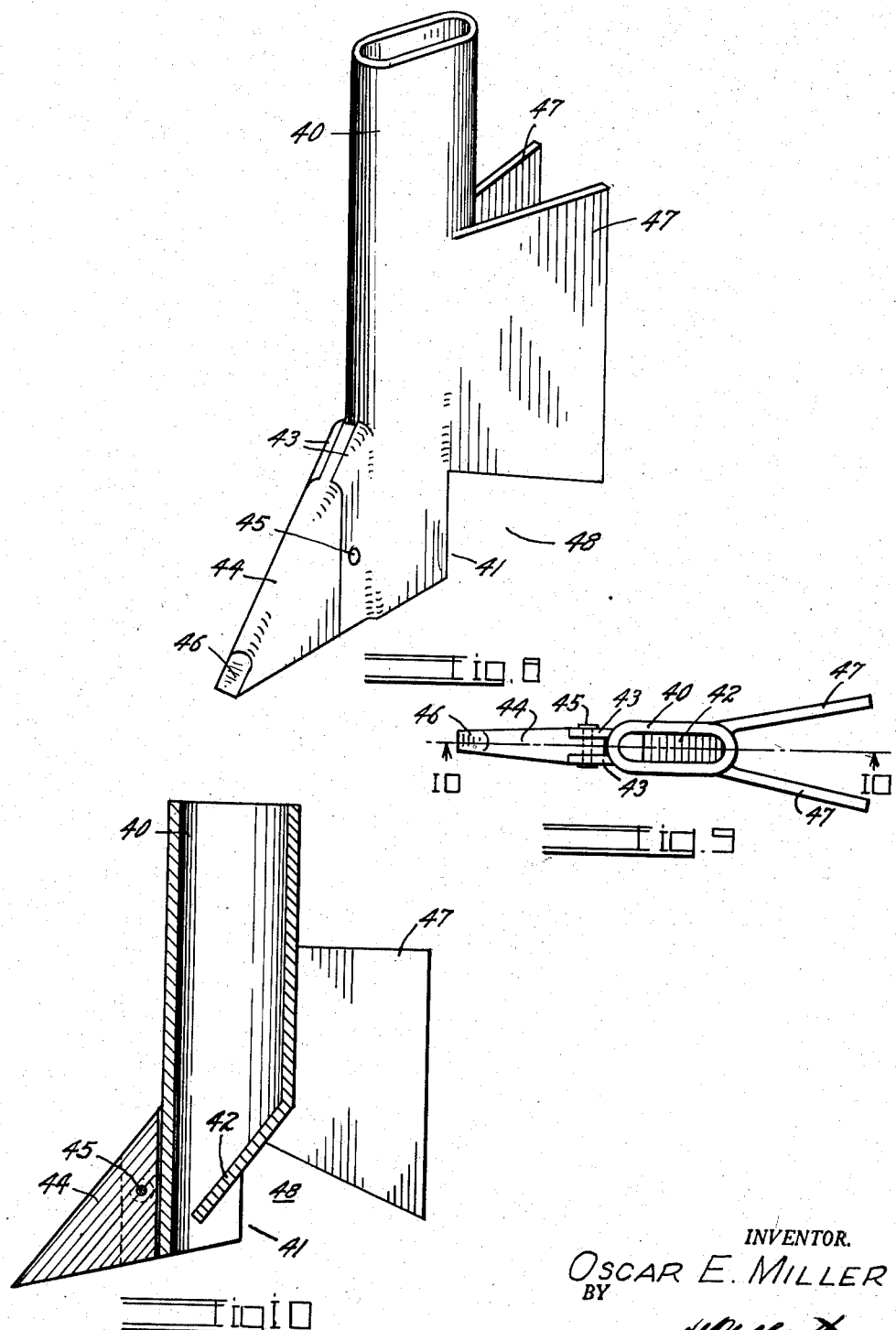

SUBSOIL PLANTING PLOWS

Oscar E. Miller, Stratton, Nebr.

Application March 4, 1957, Serial No. 643,746

1 Claim. (Cl. 111—86)

This invention relates to a subsoil planting plow for grain drills and planters, more particularly designed for use in dry land planting.

In exceedingly dry land, the upper four to six inches of soil is a comparatively loose, dry powdery dust. Below this dry dust layer is a subsoil, that is, a hard, packed layer containing some moisture known as "hardpan." The usual drill shoe or planting plow will plow a planting furrow in the dry top layers and into the hardpan and will deposit the seed in the bottom of the furrow.

The displaced, intermixed dry and moist earth at each side of the plow will fall into the furrow as the plow passes to cover the seed. The loose, dry, powdery, displaced earth flows more easily and more rapidly than the harder packed moisture containing displaced earth. Therefore, the returning dry earth will completely cover the seed before the moist earth returns to the furrow.

This dry enclosure of "moisture-hungry" dry earth will act in the nature of an absorbent wick to absorb the moisture from the earth and hardpan about the seed. As a result, all moisture is removed from adjacent the seed, the seed remains dry and fails to germinate.

The principal object of this invention is to provide a subsoil planting plow which will plow a furrow in the dry layer and a seed-receiving groove in the moist hardpan and which will allow the moist earth to return to the furrow in advance of the dry earth, so that the seed groove in the hardpan will be completely filled with moist earth and the seeds will be completely and deeply covered with moist earth before any dry earth is allowed to return to the furrow.

The moist earth filling the seed groove acts through capillary attraction to attract moisture from the surrounding hardpan so that a suitable moist condition is maintained about the seeds to cause efficient germination.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevational view of the improved subsoil planting plow;

Fig. 2 is a top view thereof;

Fig. 3 is a bottom view thereof looking upwardly;

Fig. 4 is a horizontal cross-section looking downwardly on the line 4—4, Fig. 1;

Fig. 5 is a similar horizontal section looking downwardly on the line 5—5, Fig. 1;

Fig. 6 is a diagrammatic view illustrating a cross-section through a planted and filled furrow as formed by the improved plow;

Fig. 7 is a similar diagrammatic view illustrating a cross-section through a planted and filled furrow as formed by the improved plow;

Fig. 8 illustrates an alternate construction for the improved planting plow;

Fig. 9 is a top view of the alternate construction; and

Fig. 10 is a vertical section therethrough, taken on the line 10—10, Fig. 9.

The improved drill shoe or planting plow may be mounted in any desired manner on any of the conventional grain drills or planters and may receive seeds or grain for planting from any of the conventional seed feeding mechanisms.

As illustrated, the improved plow is supported from two parallel frame bars 10 which may be secured to the implement at their forward extremities in any desired manner. The frame bars are maintained in spaced-apart, parallel relation by means of a tubular, spacing sleeve 11 through which a clamp bolt 12 passes.

The improved plow is formed on and supported from a seed tube 13 having an ovate, flat-sided cross-section. The seed tube 13 is provided, adjacent its upper extremity, with two, spaced, forwardly-extending attachment ears 14 which are mounted for angular adjustment upon a pivot bolt 15 extending through the frame bars 10. A spacing washer 16 surrounds the pivot bolt 15 between the ears 14 so that the bolt may be securely tightened without stressing the ears.

The forward and back angular position of the seed tube can be preset and maintained by means of a diagonal brace link 17, the lower extremity of which extends between two spaced-apart, rearwardly-projecting hinge ears 18 formed on the rear of the seed tube. The brace link 17 is hingedly mounted between the ears 18 upon a hinge bolt 19. A horizontally adjustable bolt 20 extends through the upper extremity of the link 17 and through horizontally-elongated bolt holes 21 in the frame bars 10. The link 17 is maintained in a central position between the frame bars 10 by means of suitable spacing washers 22.

Thus it can be seen that horizontal adjustment of the adjustable bolt 20 in the elongated holes 21 will vary the vertical angle of the seed tube and by tightening the bolt 20, the seed tube may be locked in the adjusted position.

The forward edge of the seed tube 13 merges at its lower extremity into a relatively sharp, inclined plow edge 23 which extends forwardly and downwardly at an angle of approximately 135° with the forward edge of the seed tube and approximately 45° with the ground. The plow edge 23 terminates at its forward extremity in a relatively-sharp, chisel-like, plowshare 24.

The two flat sides of the seed tube 13 merge into two flat plow sides 25 which flare outwardly at the rear and which extend inwardly toward each other at the front to join the sharp plow edge 23 and form a wedge-like, furrow-opening plow, having a V-shaped, horizontal section with an included angle of approximately 20°. The rear edge of the seed tube is extended forwardly at its lower extremity to form an inclined seed chute 26 between the two plow sides 25. The seed chute 26 terminates and discharges above and rearwardly of the plowshare 24.

The lower edges of the two plow sides 25 incline rearwardly and upwardly from the plowshare 24 at a slight angle (say 10°) for substantially one-half their length, as shown at 27, and then arch upwardly and rearwardly at each side of the plow and rearwardly of the discharge of the seed chute 26, as shown at 28.

A pair of vertical spaced-apart attachment flanges 29 are formed on the rear of the seed chute 26 and are joined at their upper extremities to the hinge ears 18. The flanges 29 extend vertically downward along the rear edges of the plow sides 25 terminating at the arcuate lower edges 28.

A mold board 30 is mounted on each flange 29 by means of suitable counter-sunk attachment screws 31.

The flanges 29 are inset from the surfaces of the seed tube 13 and from the plow sides 25 so that the external surface of each mold board will accurately and smoothly align with the sides of the seed chute and the external surfaces of the plow sides.

The two mold boards flare outwardly as their rear edges are approached so as to continue the spreading, wedge-like action of the 20° V-shape of the plow. The forward extremities of the lower edges of the mold boards 30 align with the arch 28 of the plow sides 25 and extend arcuately rearwardly and downwardly therefrom, as shown at 32, terminating in trailing points 33 positioned in a plane slightly above the plane of the plowshare 24.

The notches or arches 28 in the lower edges of the plow sides 25 and the adjoining arcuate notches or arches 32 in the lower edges of the mold boards 30 together form upwardly extending side notches or earth passages 34 at the bottom and at each side of the plow rearwardly of the discharge of the seed chute 26.

In Figs. 6 and 7, the action of the improved dry-land, subsoil plow is diagrammatically illustrated. In these figures, the comparatively loose, dry, often-cultivated, top soil is indicated in cross-section at 35 and the relatively hard, somewhat moist, hardpan is similarly indicated at 37.

In use, the improved plow is set to extend downwardly through the dry top soil 35 and into the top of the moist hardpan 37 therebelow. The depth that the hardpan is entered depends upon local conditions and upon the depth of the dry upper layer 35. The "suction" of the plow is adjusted at the bolt 20 so that it will maintain itself at the desired depth.

As the plow moves forwardly, as indicated by the arrow in Fig. 6, it will spread a furrow in the dry top soil 35 and plow a straight, flat-bottomed groove in the hardpan 37. The sides of the latter groove will be wedged outwardly by the lower portions of the flat, flaring plow sides 25 above the straight inclined edges 27, thus compressing and creating pressure in the hardpan at each side of the groove. The excess dry soil will pile at each side of the furrow therein and the excess moist earth will pile at each side of the groove in the hardpan.

The seeds, indicated at 39, will drop upon the clean bottom of the groove immediately behind the plowshare 24 and as the plow moves forwardly, the compressed sides of the groove will expand inwardly toward each other through the earth passages 34, as indicated by the arrows "A" in Fig. 6, followed by the remaining piled moist earth to completely cover the seed with a moist earth fill as indicated at 38 in Fig. 6. The returned moist earth over-fills the seed groove in the hardpan and forms a ridge thereover.

While the above described action is taking place, the displaced dry soil is being completely swept back at both sides from the seed groove by the upper portions of the flaring plow sides 25 and the flaring mold boards 30 so that no dry soil ever contacts the seed nor does it even enter the seed groove.

As the plow moves forwardly, the displaced dry soil falls inwardly behind the mold boards, as indicated by the arrows "B" in Fig. 6, to cover the protecting fill of moist earth 38 with loose dry soil, as indicated at 36.

Fig. 7 diagrammatically illustrates the completely planted seed. It will be noted that the seed is embedded in the moist hardpan 37 and is completely covered with moist earth 38 beneath the fill 36 of dry earth in the upper dry layer 36.

In Figs. 8, 9 and 10 an alternate construction of the improved planting plow is illustrated having all of the essential features of the previously described form.

This form comprises a vertical seed tube 40 formed by flattening a conventional metal tube. The seed tube is notched at its lower rear extremity, as shown at 41, and the rear wall is bent forwardly and downwardly at its lower extremity to form a seed chute 42 over the notch 41, as shown in Fig. 10.

Two vertical, spaced-apart attachment flanges 43 are welded or otherwise mounted on the front of the tube 40 adjacent the lower extremity thereof. A removable, triangular-shaped plowshare 44 is mounted between the flanges 43 in any desired manner, such as upon a removable attachment rivet 45. The rear extremity of the share 44 is reduced in width so as to provide a tenon insertable between the flanges 43 so as to preserve a smooth, continuous exterior surface. The forward extremity of the share is provided with a relatively sharp chisel point 46 similar to the share 24 previously described.

A flaring mold board 47 is welded or otherwise mounted on each side of the seed tube 40. The mold boards extend rearwardly and outwardly in flaring relation with each other. The lower edges of the mold boards 47 are elevated at their forward extremities to provide side earth passages 48.

The alternate form of planting plow is used exactly as the former-described form and functions similarly thereto. The share forms a channel in the subsoil. The moist earth closes through the earth passages 48 over the seed and the upper dry soil is spread by the mold boards 47.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A subsoil planting plow comprising: a substantially vertical, flat-sided tube having rounded forward and rear edges, the lower extremity of said rounded forward edge extending forwardly and downwardly at an angle of substantially 45° to a relatively sharp plow point, the flat sides of said tube extending rearwardly from each side of said point to form closed sides on a hollow wedge-like plow, the lower extremity of the rear edge of said tube extending forwardly and downwardly to form a seed chute between the two flat sides rearwardly of the forwardly and downwardly inclined forward edge, the lower edges of the closed sides on said wedge-like plow being inclined upwardly at an angle of substantially 10° for substantially half their lengths, thence arching for the remainder of their lengths upwardly, rearwardly and downwardly to outline the top of a side earth passage below each flat side; a pair of vertical, spaced-apart attachment flanges formed on the rear edge of said tube above said earth passages; a mold board mounted on each flange, the outer surfaces of said mold boards aligning with the lowermost portions of the outer flat sides of said tube, the lower edges of said mold boards being inclined rearwardly and downwardly and terminating in a plane slightly above said plow point; attachment ears formed on the rounded front edge of said tube adjacent the top of the latter; means for pivotally attaching said ears to a supporting frame; and a diagonally positioned brace link secured at its lower extremity between the flanges on the rear of said tube and extending rearwardly and upwardly to a connection with said supporting frame.

References Cited in the file of this patent

UNITED STATES PATENTS

| | | |
|---|---|---|
| 335,954 | Pedrick | Feb. 9, 1886 |
| 488,775 | Scandracof et al. | Dec. 27, 1892 |
| 557,046 | Bidwell | Mar. 24, 1896 |
| 602,322 | Montgomery et al. | June 7, 1898 |
| 1,184,900 | Vogel | May 30, 1916 |
| 1,311,427 | Tulloss | July 29, 1919 |
| 1,452,417 | Culbertson | Apr. 17, 1923 |
| 2,252,372 | Hand | Aug. 12, 1941 |
| 2,623,483 | Stevenson | Dec. 30, 1952 |
| 2,739,549 | Taylor | Mar. 27, 1956 |
| 2,779,263 | Franz et al. | Jan. 29, 1957 |